US012154404B2

(12) United States Patent
Voss

(10) Patent No.: US 12,154,404 B2
(45) Date of Patent: Nov. 26, 2024

(54) USING FACIAL RECOGNITION SYSTEM TO ACTIVATE AN AUTOMATED VERIFICATION PROTOCOL

(71) Applicant: ASSA ABLOY AB, Stockholm (SE)

(72) Inventor: James Scott Voss, Clovis, CA (US)

(73) Assignee: ASSA ABLOY AB, Stockholm (SE)

( * ) Notice: Subject to any disclaimer, the term of this patent is extended or adjusted under 35 U.S.C. 154(b) by 0 days.

(21) Appl. No.: 17/646,574

(22) Filed: Dec. 30, 2021

(65) Prior Publication Data

US 2022/0207946 A1 Jun. 30, 2022

Related U.S. Application Data

(60) Provisional application No. 63/132,386, filed on Dec. 30, 2020.

(51) Int. Cl.
*G07C 9/37* (2020.01)

(52) U.S. Cl.
CPC .................................... *G07C 9/37* (2020.01)

(58) Field of Classification Search
CPC .. G07C 9/37; G07C 9/00571; G07C 9/00563; G07C 9/257; G07C 9/27; H04L 9/3231; H04L 9/30
See application file for complete search history.

(56) References Cited

U.S. PATENT DOCUMENTS

| | | | | |
|---|---|---|---|---|
| 5,432,864 | A | 7/1995 | Lu et al. | |
| 8,296,573 | B2 | 10/2012 | Bolle et al. | |
| 9,552,684 | B2 | 1/2017 | Bacco et al. | |
| 9,953,231 | B1 | 4/2018 | Medina, Iii et al. | |
| 11,100,739 | B1 * | 8/2021 | Mathew | G07C 9/257 |
| 11,127,236 | B1 | 9/2021 | Kocher | |
| 11,600,127 | B2 | 3/2023 | Wu et al. | |
| 11,611,553 | B2 | 3/2023 | Caluwaert | |
| 11,620,600 | B1 | 4/2023 | Rao et al. | |

(Continued)

FOREIGN PATENT DOCUMENTS

| | | |
|---|---|---|
| WO | 2005114885 | 12/2005 |

OTHER PUBLICATIONS

"U.S. Appl. No. 17/646,591, Non Final Office Action mailed Aug. 9, 2023", 40 pgs.

(Continued)

*Primary Examiner* — Vernal U Brown
(74) *Attorney, Agent, or Firm* — Schwegman Lundberg & Woessner, P.A.

(57) ABSTRACT

A computer readable medium having executable code that causes one or more processors to: receive at least one of a first image of a user or a first representation of a face of the user; if a first image of the user was received, then generate a generated representation of the face of the user using the first image; capture a second image of the user and generate a second representation of the face of the user using the second image; determine a likelihood of a match between the second representation and at least one of the first representation and the generated representation; and if the likelihood of a match does not meet a confidence threshold, receive an authentication factor, determine validity of the authentication factor, and permit access by the user to a secure asset in instances where the authentication factor is valid.

17 Claims, 5 Drawing Sheets

(56) References Cited

U.S. PATENT DOCUMENTS

| | | | |
|---|---|---|---|
| 11,637,864 | B2 | 4/2023 | Raff et al. |
| 11,831,644 | B1 | 11/2023 | Thakore |
| 2003/0187798 | A1 | 10/2003 | Mckinley et al. |
| 2013/0097682 | A1 | 4/2013 | Zeljkovic et al. |
| 2013/0114865 | A1 | 5/2013 | Azar et al. |
| 2013/0222835 | A1 | 8/2013 | Iwamoto et al. |
| 2015/0169945 | A1 | 6/2015 | Connell, II et al. |
| 2016/0292493 | A1 | 10/2016 | Gao et al. |
| 2017/0063551 | A1 | 3/2017 | Quinn et al. |
| 2017/0308694 | A1 | 10/2017 | Belavadi |
| 2018/0189550 | A1 | 7/2018 | Mccombe et al. |
| 2018/0189583 | A1 | 7/2018 | Wohlken et al. |
| 2018/0322352 | A1* | 11/2018 | Phillips .................. G06V 20/30 |
| 2018/0367542 | A1 | 12/2018 | Wolf et al. |
| 2019/0042835 | A1 | 2/2019 | Mostafa et al. |
| 2019/0172281 | A1 | 6/2019 | Einberg et al. |
| 2019/0332848 | A1* | 10/2019 | Padmanabhan ........ G06V 20/46 |
| 2019/0373466 | A1 | 12/2019 | Jain |
| 2020/0042685 | A1 | 2/2020 | Tussy et al. |
| 2020/0228341 | A1 | 7/2020 | Mohassel et al. |
| 2021/0037000 | A1 | 2/2021 | Attard et al. |
| 2021/0173904 | A1 | 6/2021 | Almohizea |
| 2021/0312024 | A1 | 10/2021 | Gupta et al. |
| 2021/0358252 | A1 | 11/2021 | Sabripour et al. |
| 2022/0103362 | A1* | 3/2022 | Chafni .................... H04L 9/008 |
| 2022/0131698 | A1 | 4/2022 | Badrinarayanan et al. |
| 2022/0207124 | A1 | 6/2022 | Voss |
| 2022/0207912 | A1 | 6/2022 | Voss |
| 2022/0207914 | A1 | 6/2022 | Voss |
| 2022/0207915 | A1 | 6/2022 | Voss |
| 2022/0207942 | A1 | 6/2022 | Voss |
| 2022/0207943 | A1 | 6/2022 | Voss |
| 2022/0210153 | A1 | 6/2022 | Voss |

OTHER PUBLICATIONS

"U.S. Appl. No. 17/646,526, Non Final Office Action mailed Jan. 9, 2024", 12 pgs.

"U.S. Appl. No. 17/646,546, Non Final Office Action mailed Mar. 5, 2024", 33 pgs.

"U.S. Appl. No. 17/646,521, Non Final Office Action mailed Mar. 21, 2024", 26 pgs.

"U.S. Appl. No. 17/646,526, Response filed Apr. 9, 2024 to Non Final Office Action mailed Jan. 9, 2024", 14 pgs.

"U.S. Appl. No. 17/646,545, Non Final Office Action mailed May 2, 2024", 18 pgs.

"U.S. Appl. No. 17/646,526, Notice of Allowance mailed May 3, 2024", 11 pgs.

"U.S. Appl. No. 17/646,526, Corrected Notice of Allowability mailed May 24, 2024", 2 pgs.

"U.S. Appl. No. 17/646,546, Response filed Jun. 4, 24 to Non Final Office Action mailed Mar. 5, 2024", 11 pgs.

"U.S. Appl. No. 17/646,544, Non Final Office Action mailed Jun. 18, 2024", 18 pgs.

"U.S. Appl. No. 17/646,521, Response filed Jun. 21, 2024 to Non Final Office Action mailed Mar. 21, 2024", 12 pgs.

"U.S. Appl. No. 17/646,524, Notice of Allowance mailed Jun. 27, 2024", 9 pgs.

"U.S. Appl. No. 17/646,546, Final Office Action mailed Jul. 9, 2024", 34 pgs.

* cited by examiner

USING FACIAL RECOGNITION SYSTEM TO ACTIVATE AN AUTOMATED VERIFICATION PROTOCOL

CROSS-REFERENCE TO RELATED APPLICATION(S)

This application claims priority to U.S. Provisional Patent Application No. 63/132,386, titled "Using Facial Recognition System to Activate an Automated Verification Protocol," filed Dec. 30, 2020, which is hereby incorporated by reference herein in its entirety.

TECHNICAL FIELD

Embodiments described herein generally relate to facial recognition in an access control system (ACS).

BACKGROUND

Facial recognition systems were once beyond the computational power of most computers. Moreover, until relatively recently, basic algorithms to solve the problem had not yet been developed. Deep neural networks have become fairly commonplace, allowing, for example, facial recognition systems able to identify a single person out of more than ten million people in less than a second. While the systems remain quite complex, they have become quite mainstream. For example, 1:1 matching is being performed on even personal mobile devices for unlocking the devices.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

The present disclosure generally relates to facial recognition in access control systems. In general, access control covers a range of systems and methods to govern access, for example by people, to secure areas or secure assets. Physical access control includes identification of authorized users or devices (e.g., vehicles, drones, etc.) and actuation of a gate, door, or other mechanism used to secure an area or actuation of a control mechanism, e.g., a physical or electronic/software control mechanism, permitting access to a secure physical asset, such as but not limited to a computing device (e.g., desktop computer, mobile device, wearable device, copier/printer, and the like). Logical access control includes identification of authorized users or devices to provide access to logical assets, such as but not limited to, an application, a cloud-based service, or a financial or personal account. Physical access control systems (PACS) and logical access control systems (LACS) can generally include a reader (e.g., an online or offline reader) that holds authorization data and can be capable of determining whether credentials (e.g., from credential or key devices such as radio frequency identification (RFID) chips in cards, fobs, magnetic stripe cards, or personal electronic devices such as mobile phones) are authorized for accessing the secure area or asset. Alternatively, PACS/LACS can include a host server to which readers are operably connected (e.g., via a controller) in a centrally managed configuration. In centrally managed configurations, readers can obtain credentials from credential or key devices and pass those credentials to the PACS/LACS host server. The host server can then determine whether the credentials authorize access to the secure area or secure asset and command the actuator or other control mechanism accordingly or can command the reader to operate the actuator or other control mechanism accordingly.

Wireless PACS/LACS, e.g., those that utilize wireless communication between the reader and the credential or key device, such as for secure credential exchange, can use RFID or personal area network (PAN) technologies, such as the IEEE 802.15.1, Bluetooth, Bluetooth Low Energy (BLE), near field communications (NFC), ZigBee, GSM, CDMA, Wi-Fi, ultrawide band (UWB), etc. PACS/LACS may additionally or alternatively include facial recognition capabilities and use facial recognition as a sole, primary (e.g., main or first authentication factor of two or more authentication factors), or secondary authentication factor (e.g., authentication factor that is in addition to or secondary to a primary authentication factor).

Figure 1:
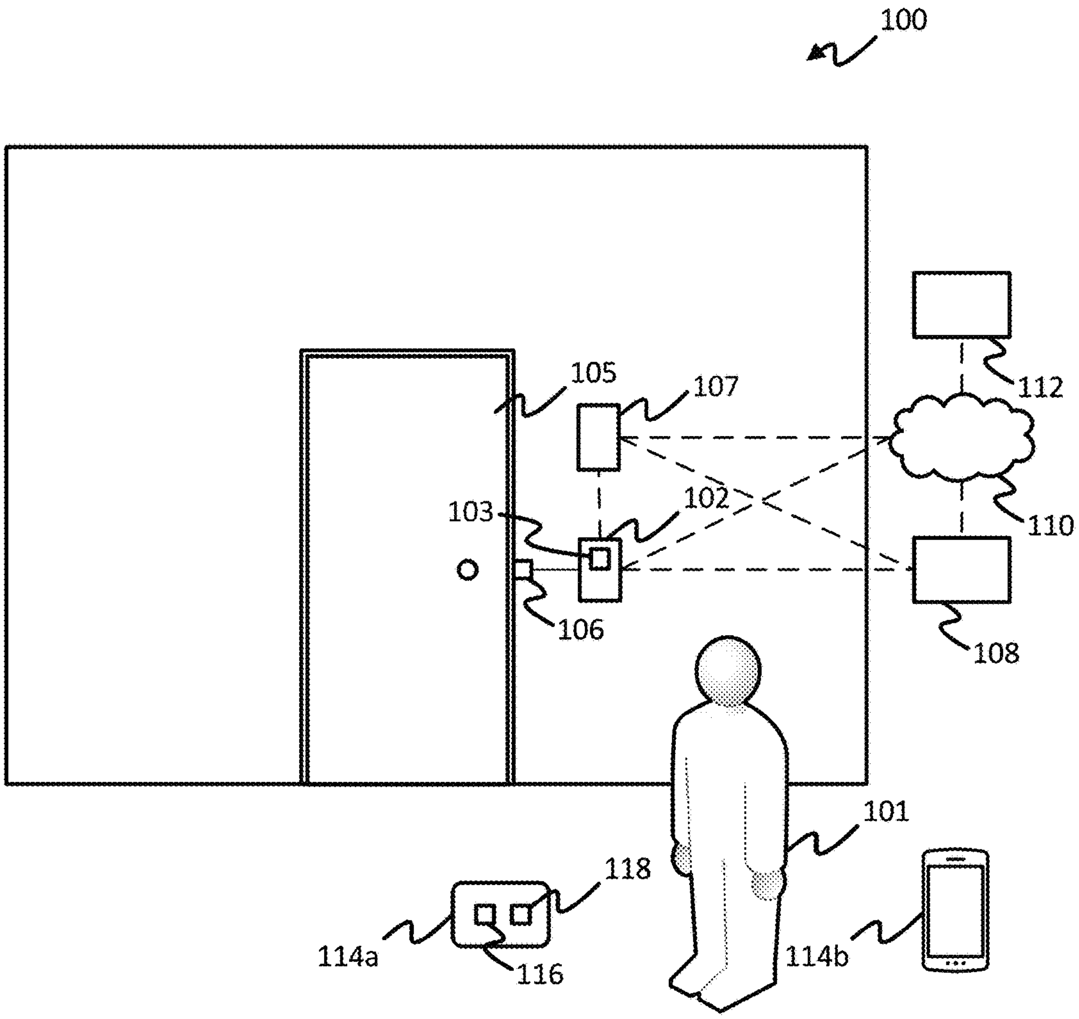
FIG. 1 illustrates a front view of an example ACS, or portions thereof.
Figure 2:
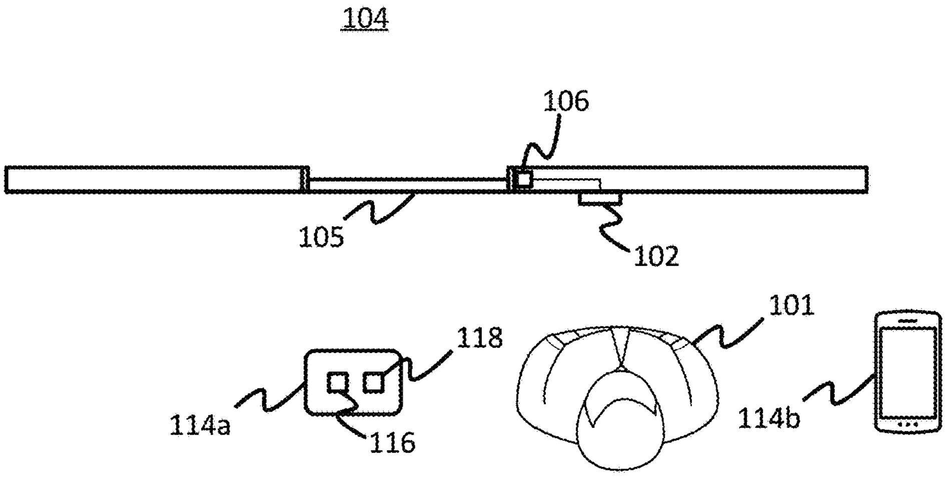
FIG. 2 illustrates a top cross-sectional view of an example ACS, or portions thereof.

FIGS. 1 and 2 illustrate an example access control system (ACS) 100, or portions thereof. While FIGS. 1 and 2 primarily illustrate a PACS, it is recognized that the present disclosure similarly relates to LACS, and that while the secure asset in FIGS. 1 and 2 is illustrated as a secure area surrounded by a wall and protected by a physical access point (e.g., a door) and the control mechanism is described as a locking mechanism, the secure asset could instead be a logical asset (e.g., an application, a cloud-based service, or a financial or personal account), the control mechanism could be an electronic/software control mechanism separate from or incorporated with the reader device, and the reader device need not be fixed and could include a device owned or operated by the user, such as a mobile device (e.g., smart phone, tablet, or the like).

ACS 100 can include a reader device, or simply reader, 102 associated with a secure area, access point, or other asset 104. In some cases, such as in the example illustrated in FIG. 1, secure asset 104 is a secure area secured by an access point 105, such as a door, gate, turnstile or the like controlling or permitting authorized access to the secure area, but as explained above, secure asset 104 may alternatively be a logical asset. Reader 102 can include or be operably connected with a control mechanism 106, such as but not limited to a locking mechanism in the case of PACS or an electronic/software control mechanism in the case of LACS, that controls whether access via access point 105 is permitted (e.g., can be opened or accessed) or may even control opening and/or closing of the access point. Reader 102 can be an offline reader, e.g., a reader not connected to a control panel or host server, and in such cases may make its own access control determinations and directly operate or command control mechanism 106, accordingly. Reader 102 can be a wireless reader device, in that the reader may communicate with credential or key devices via wireless technologies, such as RFID or PAN technologies, such as the IEEE 802.15.1, Bluetooth, Bluetooth Low Energy (BLE), near field communications (NFC), ZigBee, GSM, CDMA, Wi-Fi, UWB, etc. Reader 102 may also include a PIN pad, touch screen, fingerprint reader, magnetic stripe reader, chip reader, or other non-wireless input means for receiving credential or other information, such as a PIN or other secret code, biometric information such as a fingerprint, or information from a magnetic stripe card or chip card, for example.

Reader 102 may also include facial recognition capabilities. For example, reader 102 may include a facial recognition module 103 or otherwise integrate facial recognition components within the reader. Facial recognition module 103 may include one or more cameras or other optical sensors for capturing or receiving one or more images, such as one or more images of a user 101. Facial recognition module 103 may also include one or more processors and memory for performing facial recognition or facial verification using the captured or received images. Facial recognition module 103 may alternatively or additionally utilize one or more processors and/or memory of the reader 102. According to a first method, facial verification computes a one-to-one similarity between a probe image (e.g., image of the user's 101 face) or other representation of the probe image (e.g., template or feature vector as described further below) and each of one or more images or other representations of images (e.g., templates or feature vectors) selected from a gallery of images/templates to determine whether the probe image or template is, or the likelihood the probe image or template is, for the same subject as one or more of the gallery images or templates. Such may be referred to herein as a one-to-many facial verification. According to another method, facial verification computes a one-to-one similarity between a probe image (e.g., image of the user's 101 face) or other representation of the probe image (e.g., template or feature vector) and an image or other representation of an image (e.g., template or feature vector) previously stored (e.g., based on a previously enrolled image of the user's 101 face). Such may be referred to herein, generally, as a one-to-one facial verification. Facial verification need not be carried out on, for example, a pixel level between the probe and gallery due to the fact that there are generally too many variations and nuisances within raw face images. Instead, high-level features from face images may be extracted (e.g., as a representation or template of the subject's face) through either conventional methods, such as HOG, SIFT, etc., or a more advanced and data driven neural network approach, such as Dlib, Arcface, etc. The verification can then be conducted among, for example, the templates (e.g., face feature vectors) using similarity metrics such as Euclidean distance or cosine similarity.

Additionally or alternatively, ACS 100 may include a facial recognition module 107 that is external to reader 102, located within a vicinity (e.g., 20 meters) of the reader and/or secure asset 104. Facial recognition module 107 may comprise one or more components for providing the facial recognition or facial verification capabilities. For example, facial recognition module 107 may include one or more cameras or other optical sensors for capturing or receiving one or more images, such as one or more images of a user 101. Facial recognition module 107 may also include one or more processors and memory for performing facial recognition or facial verification using the captured or received images. Facial recognition module 107 may be operably connected by wire or wirelessly with reader 102, and may alternatively or additionally utilize one or more processors and/or memory of the reader 102.

In some cases, reader 102 can be connected by wire or wirelessly to a control panel 108. In such cases, reader 102 may transmit credential information to control panel 108, and the control panel may make, or may share responsibilities with the reader in making, access control determinations. Based on the access control determinations, control panel 108 can instruct reader 102 to operate or command control mechanism 106, accordingly. Alternately, control panel 108 can be connected directly or wirelessly to control mechanism 106, and in such cases may directly operate or command the control mechanism, accordingly, bypassing reader 102.

In some cases, reader 102 and control panel 108, and even control mechanism 106, can be connected to a wired or wireless network 110 and communicate with each other, as described above, via the network. Example networks can include a local area network (LAN), a wide area network (WAN), a packet data network (e.g., the Internet), mobile telephone networks (e.g., cellular networks), Plain Old Telephone (POTS) networks, wireless data networks (e.g., networks based on the IEEE 802.11 family of standards known as Wi-Fi or the IEEE 802.16 family of standards known as WiMax), networks based on the IEEE 802.15.4 family of standards, and peer-to-peer (P2P) networks, among others. If ACS 100 is managed by a remote system, the ACS can include a host server 112 connected by wire or wirelessly to network 110 and that may communicate with reader 102 and/or control panel 108. In such cases, reader 102 can transmit credential information to host server 112 via network 110 or can transmit credential information to control panel 108, which can then transmit the credential information to the host server via the network. Host server 112 may make, or may share responsibilities with reader 102 and/or control panel 108 in making, access control determinations. Based on the access control determinations, host server 112 can instruct reader 102, directly or indirectly via control panel 108, to operate or command control mechanism 106, accordingly. Alternately, host server 112 can instruct control panel 108 to operate or command control mechanism 106, accordingly. In still another example, host server 112 can be connected via network 110 to control mechanism 106 and directly operate or command the control mechanism, accordingly, bypassing reader 102 and control panel 108.

Facial recognition module 107 may similarly be connected by wire or wirelessly to control panel 108 and may exchange information relating to facial verification or other information directly with the control panel. Likewise, facial recognition module 107 can be connected to a wired or wireless network 110 and may communicate with any of the reader 102, control panel 108, and host server 112, via the network. Any data, such as but not limited to, gallery images or templates, instructions, algorithms, and/or trained machine learning models may be stored at or distributed across any one or more of the reader 102, facial recognition module 103/107, controller 108, or host server 112. Likewise, facial recognition or verification may be performed at or across one or more of the reader 102, facial recognition module 103/107, controller 108, or host server 112.

Figure 3:
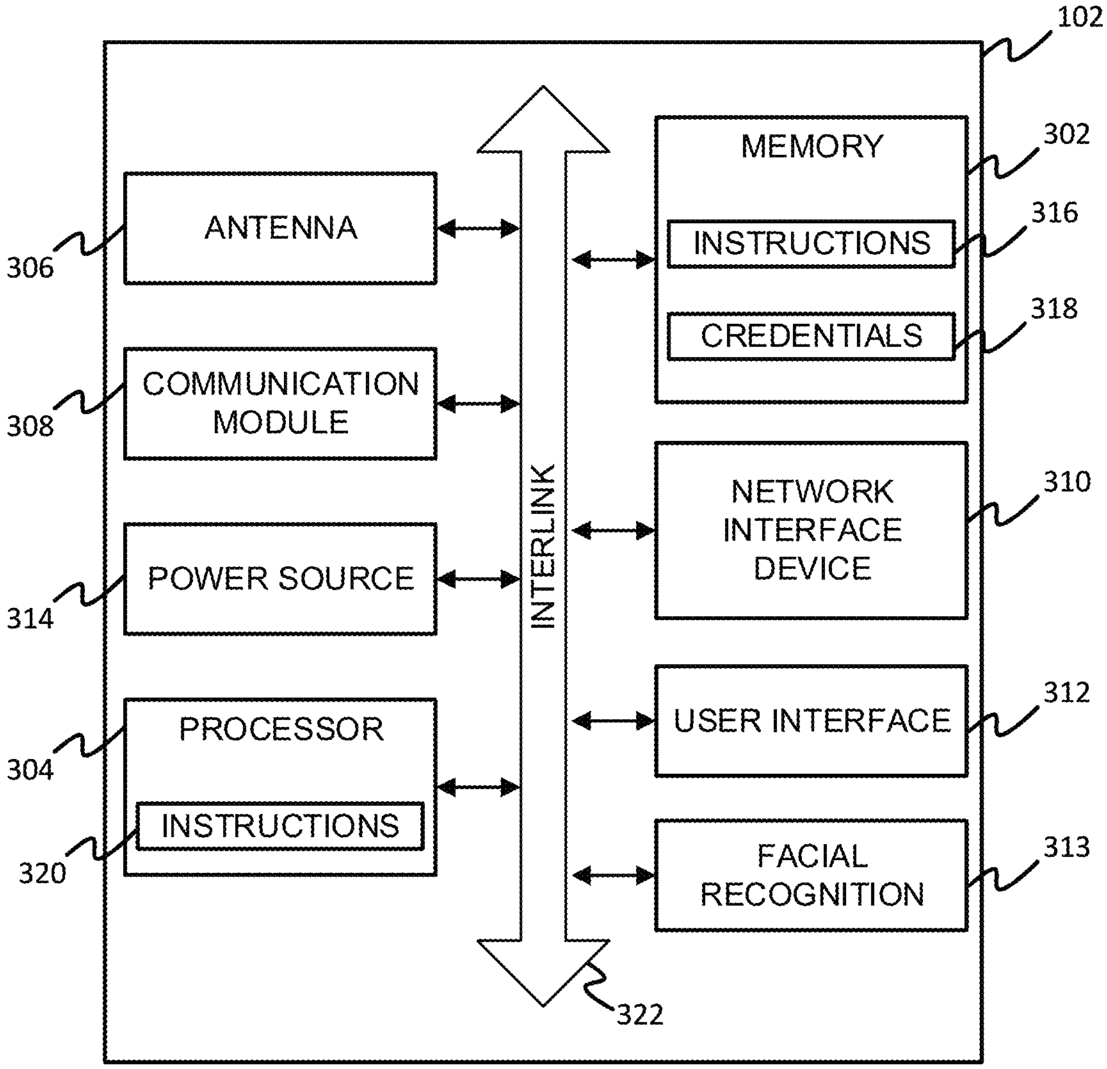
FIG. 3 illustrates a block diagram schematic of various components of an example ACS reader.

FIG. 3 illustrates a block diagram schematic of various components of an example reader 102 or facial recognition module 107. In general, reader 102 and/or facial recognition module 107 can include one or more of a memory 302, a processor 304, one or more antennas 306, a communication module 308, a network interface device 310, a user interface 312, a facial recognition module 313, and a power source or supply 314. While reader 102 and facial recognition module 107 are illustrated in FIG. 2 as devices affixed to a surface, for example a wall, reader 102 and/or facial recognition module 107 may also be a free-standing device or a portable device, such as but not limited to a mobile device. Moreover, in some example embodiments, such as but not limited to certain LACS embodiments, reader 102 and/or facial recognition module 107 may be a mobile device of the user, wherein, for example, the user may be attempting to access a logical asset via the user's own mobile device.

Memory 302 can be used in connection with the execution of application programming or instructions by processor 304, and for the temporary or long-term storage of program instructions or instruction sets 316 and/or credential or authorization data 318, such as credential data, credential authorization data, access control data or instructions, or facial recognition or verification data or instructions. For example, memory 302 can contain executable instructions 316 that are used by the processor 304 to run other components of reader 102 and/or to make access determinations based on credential or authorization data 318. Memory 302 can comprise a computer readable medium that can be any medium that can contain, store, communicate, or transport data, program code, or instructions for use by or in connection with reader 102. The computer readable medium can be, for example but is not limited to, an electronic, magnetic, optical, electromagnetic, infrared, or semiconductor system, apparatus, or device. More specific examples of suitable computer readable medium include, but are not limited to, an electrical connection having one or more wires or a tangible storage medium such as a portable computer diskette, a hard disk, a random access memory (RAM), a read-only memory (ROM), an erasable programmable read-only memory (EPROM or EEPROM), Dynamic RAM (DRAM), any solid-state storage device, in general, a compact disc read-only memory (CD-ROM), or other optical or magnetic storage device. Computer-readable media includes, but is not to be confused with, computer-readable storage medium, which is intended to cover all physical, non-transitory, or similar embodiments of computer-readable media.

Processor 304 can correspond to one or more computer processing devices or resources. For instance, processor 304 can be provided as silicon, as a Field Programmable Gate Array (FPGA), an Application-Specific Integrated Circuit (ASIC), any other type of Integrated Circuit (IC) chip, a collection of IC chips, or the like. As a more specific example, processor 304 can be provided as a microprocessor, Central Processing Unit (CPU), or plurality of microprocessors or CPUs that are configured to execute instructions sets stored in an internal memory 320 and/or memory 302.

Antenna 306 can correspond to one or multiple antennas and can be configured to provide for wireless communications between reader 102 and/or facial recognition module 107 and a credential or key device. Antenna(s) 306 can be arranged to operate using one or more wireless communication protocols and operating frequencies including, but not limited to, the IEEE 802.15.1, Bluetooth, Bluetooth Low Energy (BLE), near field communications (NFC), ZigBee, GSM, CDMA, Wi-Fi, RF, UWB, and the like. By way of example, antenna(s) 306 can be RF antenna(s), and as such, may transmit/receive RF signals through free-space to be received/transferred by a credential or key device having an RF transceiver.

Communication module 308 can be configured to communicate according to any suitable communications protocol with one or more different systems or devices either remote or local to reader 102 and/or facial recognition module 107, such as one or more control mechanisms 106 or control panel 108.

Network interface device 310 includes hardware to facilitate communications with other devices, such as control panel 108 or host server 112, over a communication network, such as network 110, utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), Plain Old Telephone (POTS) networks, wireless data networks (e.g., networks based on the IEEE 802.11 family of standards known as Wi-Fi or the IEEE 802.16 family of standards known as WiMax), networks based on the IEEE 802.15.4 family of standards, and peer-to-peer (P2P) networks, among others. In some examples, network interface device 310 can include an Ethernet port or other physical jack, a Wi-Fi card, a Network Interface Card (NIC), a cellular interface (e.g., antenna, filters, and associated circuitry), or the like. In some examples, network interface device 310 can include one or more antennas to wirelessly communicate using at least one of single-input multiple-output (SIMO), multiple-input multiple-output (MIMO), or multiple-input single-output (MISO) techniques.

User interface 312 can include one or more input devices and/or output devices. Examples of suitable user input devices that can be included in user interface 312 include, without limitation, one or more buttons, a keyboard, a mouse, a touch-sensitive surface, a stylus, a camera, a microphone, a PIN pad, touch screen, fingerprint reader, magnetic stripe reader, chip reader, etc. Examples of suitable user output devices that can be included in user interface 312 include, without limitation, one or more LEDs, a LCD panel, a display screen, a touchscreen, one or more lights, a speaker, etc. It should be appreciated that user interface 312 can also include a combined user input and user output device, such as a touch-sensitive display or the like.

Facial recognition module 313 may include one or more cameras or other optical sensors for capturing or receiving one or more images, such as one or more images of a user 101. Alternatively or additionally, facial recognition module 313 may utilize one or more cameras, if provided, of user interface 312. Facial recognition module 313 may also include its own processor or processors and/or memory for performing facial recognition or facial verification using the captured or received images. As noted above, facial recognition module 313 may alternatively or additionally utilize one or more processors 304 and/or memory 302 of the reader 102 for performing some or all of the facial recognition or facial verification. The memory of facial recognition module 313 (or reader 102) may, for example, store one or more gallery images or other representations of images, such as templates. The memory of facial recognition module 313 (or reader 102) may additionally or alternatively store instructions, algorithms, and/or one or more trained machine learning models for performing facial recognition or verification.

Power source 314 can be any suitable internal power source, such as a battery, capacitive power source or similar type of charge-storage device, etc., and/or can include one or more power conversion circuits suitable to convert external power into suitable power (e.g., conversion of externally-supplied AC power into DC power) for components of the reader 102 and/or facial recognition module 107. Power source 314 can also include some implementation of surge protection circuitry to protect the components of reader 102 and/or facial recognition module 107 from power surges.

Reader 102 and/or facial recognition module 107 can also include one or more interlinks or buses 322 operable to transmit communications between the various hardware components of the reader. A system bus 322 can be any of several types of commercially available bus structures or bus architectures.

Figure 4:
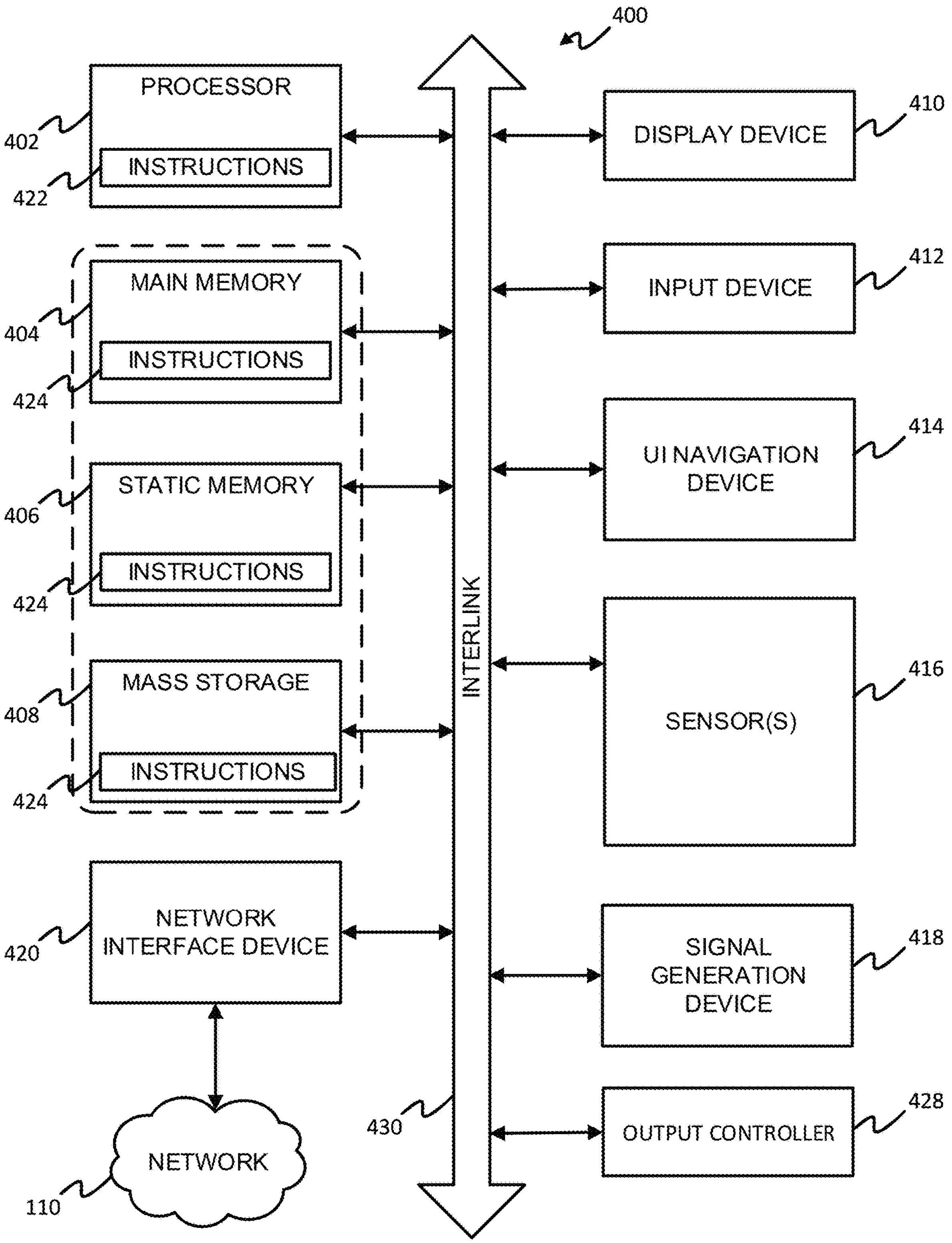
FIG. 4 illustrates a block diagram schematic of various example components of an example machine that may be used as, for example, an ACS control panel or ACS host server.

FIG. 4 illustrates a block diagram schematic of various example components of an example machine 400 that can be used as, for example, control panel 108 and/or host server 112. Examples, as described herein, can include, or can operate by, logic or a number of components, modules, or mechanisms in machine 400. Modules may be hardware, software, or firmware communicatively coupled to one or more processors in order to carry out the operations described herein. Generally, circuitry (e.g., processing circuitry) is a collection of circuits implemented in tangible entities of machine 400 that include hardware (e.g., simple circuits, gates, logic, etc.). Circuitry membership can be flexible over time. Circuitries include members that can, alone or in combination, perform specified operations when operating. In some examples, hardware of the circuitry can be immutably designed to carry out a specific operation (e.g., hardwired). In some examples, the hardware of the circuitry can include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions permit embedded hardware (e.g., the execution units or a loading mechanism) to create members of the circuitry in hardware via the variable connections to carry out portions of the specific operation when in operation. Accordingly, in some examples, the machine readable medium elements are part of the circuitry or are communicatively coupled to the other components of the circuitry when the device is operating. In some examples, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time. Additional and/or more specific examples of components with respect to machine 400 follow.

In some embodiments, machine 400 can operate as a standalone device or can be connected (e.g., networked) to other machines. In a networked deployment, machine 400 can operate in the capacity of a server machine, a client machine, or both in server-client network environments. In some examples, machine 400 can act as a peer machine in a peer-to-peer (P2P) (or other distributed) network environment. Machine 400 can be or include a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Machine (e.g., computer system) 400 can include a hardware processor 402 (e.g., a central processing unit (CPU), a graphics processing unit (GPU), a hardware processor core, or any combination thereof) and a main memory 404, a static memory (e.g., memory or storage for firmware, microcode, a basic-input-output (BIOS), unified extensible firmware interface (UEFI), etc.) 406, and/or mass storage 408 (e.g., hard drives, tape drives, flash storage, or other block devices) some or all of which can communicate with each other via an interlink (e.g., bus) 430. Machine 400 can further include a display device 410 and an input device 412 and/or a user interface (UI) navigation device 414. Example input devices and UI navigation devices include, without limitation, one or more buttons, a keyboard, a touch-sensitive surface, a stylus, a camera, a microphone, etc.). In some examples, one or more of the display device 410, input device 412, and UI navigation device 414 can be a combined unit, such as a touch screen display. Machine 400 can additionally include a signal generation device 418 (e.g., a speaker), a network interface device 420, and one or more sensors 416, such as a global positioning system (GPS) sensor, compass, accelerometer, or other sensor. Machine 400 can include an output controller 428, such as a serial (e.g., universal serial bus (USB), parallel, or other wired or wireless (e.g., infrared (IR), NFC, etc.) connection to communicate or control one or more peripheral devices (e.g., a printer, card reader, etc.).

Processor 402 can correspond to one or more computer processing devices or resources. For instance, processor 402 can be provided as silicon, as a Field Programmable Gate Array (FPGA), an Application-Specific Integrated Circuit (ASIC), any other type of Integrated Circuit (IC) chip, a collection of IC chips, or the like. As a more specific example, processor 402 can be provided as a microprocessor, Central Processing Unit (CPU), or plurality of microprocessors or CPUs that are configured to execute instructions sets stored in an internal memory 422 and/or memory 404, 406, 408.

Any of memory 404, 406, and 408 can be used in connection with the execution of application programming or instructions by processor 402 for performing any of the functionality or methods described herein, and for the temporary or long-term storage of program instructions or instruction sets 424 and/or other data for performing any of the functionality or methods described herein. Any of memory 404, 406, 408 can comprise a computer readable medium that can be any medium that can contain, store, communicate, or transport data, program code, or instructions 424 for use by or in connection with machine 400. The computer readable medium can be, for example but is not limited to, an electronic, magnetic, optical, electromagnetic, infrared, or semiconductor system, apparatus, or device. More specific examples of suitable computer readable medium include, but are not limited to, an electrical connection having one or more wires or a tangible storage medium such as a portable computer diskette, a hard disk, a random access memory (RAM), a read-only memory (ROM), an erasable programmable read-only memory (EPROM or EEPROM), Dynamic RAM (DRAM), a solid-state storage device, in general, a compact disc read-only memory (CD-ROM), or other optical or magnetic storage device. As noted above, computer-readable media includes, but is not to be confused with, computer-readable storage medium, which is intended to cover all physical, non-transitory, or similar embodiments of computer-readable media.

Network interface device 420 includes hardware to facilitate communications with other devices over a communication network, such as network 110, utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), Plain Old Telephone (POTS) networks, wireless data networks (e.g., networks based on the IEEE 802.11 family of standards known as Wi-Fi or the IEEE 802.16 family of standards known as WiMax), networks based on the IEEE 802.15.4 family of standards, and peer-to-peer (P2P) networks, among others. In some examples, network interface device 420 can include an Ethernet port or other physical jack, a Wi-Fi card, a Network Interface Card (NIC), a cellular interface (e.g., antenna, filters, and associated circuitry), or the like. In some examples, network interface device 420 can include one or more antennas to wirelessly communicate using at least one of single-input multiple-output (SIMO), multiple-input multiple-output (MIMO), or multiple-input single-output (MISO) techniques.

As indicated above, machine 400 can include one or more interlinks or buses 430 operable to transmit communications between the various hardware components of the machine. A system bus 322 can be any of several types of commercially available bus structures or bus architectures.

With reference back to FIGS. 1 and 2, in use, as a user 101 having a credential or key device 114 (illustrated, for example, as a smartcard 114*a* or mobile device 114*b*) approaches reader 102 associated with access point 105, the credential device 114 may communicate the user's credential or credential data to the reader, for example, via a suitable RFID or PAN technology. In general, a credential device 114 may include any device that carries evidence of authority, status, rights, and/or entitlement to privileges for a holder of the credential device. A credential device 114 can be a portable device having memory 116, storing one or more user credentials or credential data, and a reader interface (i.e., an antenna and Integrated Circuit (IC) chip) 118, which permits the credential to exchange data with a reader device, such as reader 102, via a credential interface of the reader device, such as antenna 306. One example of credential device 114 is an RFID smartcard (e.g., smartcard 114*a*) that has data stored thereon allowing a holder of the credential device to access a secure area or asset protected by reader 102, such as secure area 104. Other examples of credential devices 114 include, but are not limited to, proximity RFID-based cards, access control cards, credit cards, debit cards, passports, identification cards, key fobs, NFC-enabled devices, mobile phones (e.g., mobile device 114*b*), personal digital assistants (PDAs), tags, or any other device configurable to emulate a virtual credential. In some example embodiments, such as but not limited to certain LACS embodiments, reader 102 and/or facial recognition module 103/107 and credential device 114 may be the same device, wherein, for example, the user may be attempting to access a logical asset via the user's own mobile device (e.g., mobile device 114*b*).

If reader 102, control panel 108, and/or host server 112 determine that the user's 101 credential or credential data provided by credential device 114 is valid and/or authorized, reader 102, control panel 108, or host server 112 may operate control mechanism 106 to allow access to the secure asset 104 by the user 101 having the credential device. In some embodiments, facial recognition may be used as a second authentication factor, authentication of which may be required before reader 102, control panel 108, and/or host server 112 operate control mechanism 106 to allow access to the secure asset 104 by the user 101 having the credential device. In other example embodiments, facial recognition may be used as a sole authentication factor, and thus, credential data from the user's credential device 114 need not be provided or authenticated.

Facial recognition systems generally require a user 101 to have one or more verified pictures of their face captured (e.g., an enrollment photo), such as during an enrollment step or process. Such enrollment may be completed using a device operably connected by wire or wirelessly to ACS 100, such as to the host server 112. Such device may be, or may be similar to, any of the devices described herein, such as the reader 102, facial recognition module 107, controller 108, credential device 114*b*, or the like. ACS 100 may use the enrollment photo(s) to develop one or more representations of the user's 101 face, such as one or more facial templates, that generally represent various characteristics of the user's face, such as but not limited to, the spacing between two or more facial elements, the size of one or more facial elements, the aspect ratio of one or more facial elements, the shape of one or more facial elements, the position relative within the face of one or more facial elements, etc.

Once a facial template (or other representation) has been created, it may be distributed to a variety of devices throughout ACS 100, such as one or more host servers 112, one or more controllers 108, and/or one or more readers 106. Subsequently, when an image or video feed (e.g., from which images can be obtained) of the user 101 is captured by reader 102 or facial recognition module 103/107, the facial recognition module 103/107, alone or in conjunction with reader 102, controller 108, and/or host server 112, can create a substantially real-time representation or model (e.g., facial template) of the user's face using one or more images captured by reader 102 or facial recognition module 103/107 and may search through facial representations or templates of a plurality of enrolled users previously distributed (e.g., the gallery) and determine whether there is a match. Facial recognition module 103/107, alone or in conjunction with reader 102, controller 108, and/or host server 112, may take advantage of a deep neural network that has been trained to analyze faces and search a database of facial representations or templates (e.g., a gallery) to determine matches.

Facial recognition module 103/107, alone or in conjunction with reader 102, controller 108, and/or host server 112, may return one or more potential or probable matches for the image of the user 101 captured by reader 102 or facial recognition module 103/107, along with a "confidence" value associated with each match. The confidence value may be affected by many factors, such as but not limited to, the quality of the representation or template generated from the enrollment photo, the quality of the image or video feed captured by reader 102 or facial recognition module 103/107, ambient lighting, age or aging of the user, and changes in appearance of the user, such as due to changes in facial hair, addition or removal of glasses, etc. The facial recognition module 103/107, alone or in conjunction with reader 102, controller 108, and/or host server 112, may determine whether the confidence value of a match meets or exceeds a certain, possibly predefined, threshold for authentication, and if so, then the ACS 100, such as via reader 102, facial recognition module 103/107, controller 108, and/or a host server 112, may permit access to the secure asset 104 by the user of the credential device 114.

There are potential drawbacks, however, to an "offline" enrollment process, such as the one described above, wherein an enrollment photo of the user's 101 face is captured using a device operably connected to ACS 100 and then one or more representations of the user's 101 face, such as one or more facial templates, are distributed to devices throughout the ACS. One drawback is the need to create templates (or other representations) and distribute them through potentially a wide-ranging network, assuming a communications network exists at all. For example, in ultra-high level security deployments of an ACS 100, many of the devices of the ACS may not be connected to a wide area network, such as the Internet. Additionally, current and developing requirements for protecting a person's biometric data create problems for wide distribution of facial recognition data, such as the templates described herein. Accordingly, many entities or companies are choosing never to store, or even transmit, such data for fear of potential exposure if there was ever a data breach.

Accordingly, in an example embodiment, the one or more facial templates (or other representations) of a user 101 generated from the enrollment photo(s) of the user may be generated by, or distributed to, and stored directly on the user's credential device 114. As the user 101 approaches reader 102 and/or facial recognition module 103/107, the user's credential device 114 may establish a secure connection with the reader and/or facial recognition module to transmit one or more of the user's facial templates (or other representations) stored on the credential device to the reader and/or facial recognition module, for example, via a suitable RFID or PAN technology. This may be done independently or in connection with the communication from the credential device 114 to the reader 102 and/or facial recognition module 103/107 of the user's credential or credential data, as discussed above. At least one template or other representation transmitted from the credential device 114 to the reader 102 and/or facial recognition module 103/107 may then be used as the gallery image for comparison against the template or other representation generated from the probe image of the user 101 captured in substantially real-time by the reader and/or facial recognition module, as described above.

In another example embodiment, one or more images (e.g., conventional user or non-templated images, such as but not limited to, a "normal" photograph or .JPG image) of a user 101, not dissimilar from the type of image used as an enrollment photo, may be captured by, or distributed to, and stored directly on the user's credential device 114. As the user 101 approaches reader 102 and/or facial recognition module 103/107, the user's credential device 114 may establish a secure connection with the reader and/or facial recognition module to transmit one or more of the images stored on the credential device to the reader and/or facial recognition module, for example, via a suitable RFID or PAN technology. This may be done independently or in connection with the communication from the credential device 114 to the reader 102 and/or facial recognition module 103/107 of the user's credential or credential data, as discussed above. The reader 102 and/or facial recognition module 103/107, alone or in conjunction with the controller 108 and/or host server 112, can create a substantially real-time representation or model (e.g., facial template) of the user's face using the one or more images received from the user's 101 credential device 114. The representation or template generated using the one or more images received from the user's 101 credential device 114 may then be used as the gallery image for comparison against the template or other representation generated from the probe image of the user 101 captured in substantially real-time by the reader and/or facial recognition module, as described above.

The confidence value may be provided as a numerical value on any suitable scale, such as but not limited to, a scale of 0 to 1, a scale of 0 to 10, a scale of 0 to 20, a scale of 0 to 100, etc. In the context of a given scale, the confidence value may also be considered as or translated to a percentage. For example, a confidence value of 0.5 on a scale of 0 to 1 may also be considered as or translated to a confidence value of 50%; a confidence value of 6 on a scale of 0 to 10 may also be considered as or translated to a confidence value of 60%; a confidence value of 14 on a scale of 0 to 20 may also be considered as or translated to a confidence value of 70%; or a confidence value of 80 on a scale of 0 to 100 may also be considered as or translated to a confidence value of 80%.

The confidence value is hardly ever 100% (or numerical equivalent). Moreover, often depending upon various factors, such as but not limited to, the quality of the representation or template generated from the enrollment photo, the quality of the image or video feed captured by reader 102 or facial recognition module 103/107, ambient lighting, age or aging of the user, and changes in appearance of the user, such as due to changes in facial hair, addition or removal of glasses, etc., the confidence value could be relatively low, such as 80% or lower. Typically, a confidence value of 80% would not be high enough to meet the requisite threshold for authentication and allow access to a secure asset. Depending on the level of security required in a given ACS deployment, even a confidence value of upwards of 95% might not be good enough. Accordingly, facial recognition is not commonly used, or even considered, for unsupervised ACS deployments. Moreover, it is not commonly deployed in ultra-secure PACS or as a sole means of access control.

This contrasts conventional card ACS embodiments that generally have a 100% confidence that a given credential is authorized or not. Generally, in conventional card ACS embodiments, there are no confidence values between 0% (e.g., failure/denial) and 100% (e.g., authenticated/permitted). However, a drawback of conventional card ACS embodiments is that there is no way to tell whether the person carrying the credential is actually the authenticated or authorized user.

Accordingly, the present disclosure provides ACS embodiments with facial recognition that is generally tolerant of various factors, such as but not limited to, the quality of the representation or template generated from the enrollment photo, the quality of the image or video feed captured by reader 102 or facial recognition module 103/107, ambient lighting, age or aging of the user, and changes in appearance of the user, such as due to changes in facial hair, addition or removal of glasses, etc., that can affect the confidence value. Specifically, in various example ACS embodiments of the present disclosure, facial recognition may be used in combination with the provision of one or more other authentication factors or modalities, such as but not limited to, a typical proximity or smart card having a credential or credential data stored thereon, a magnetic stripe card having a credential or credential data stored thereon, a password via, for example, user interface 312, a fingerprint, iris scan, or other biometric via, for example, user interface 312, voice recognition, etc. Depending on, for example, whether such second (not necessarily secondary) authentication factor is provided, the number of such second authentication factors provided, the type of such second authentication factor(s), and/or an authentication confidence of each of one or more of such second authentication factors, the threshold that the confidence value for facial recognition must meet may dynamically change. Particularly, the threshold that the confidence value for facial recognition must meet may be higher when no other second authentication factor is provided and authenticated than when facial recognition is combined with the authentication/verification of at least one other authentication factor, such as but not limited to, those identified above. Moreover, the threshold that the confidence value for facial recognition must meet may vary depending on the number of such second authentication factors provided and/or the type of such second authentication factor(s). For example, the threshold that the confidence value for facial recognition must meet when combined with authentication of a typical proximity or smart card may be lower than the threshold that the confidence value for facial recognition must meet when combined with authentication of a password provided by the user. Additionally, the threshold that the confidence value for facial recognition must meet may dynamically lower as the number of second authentication factors or modalities provided increases. In general, the threshold that the confidence value for facial recognition must meet may dynamically change based on the number and/or type of modalities and the confidence in each one.

As a first example, in an ACS using facial recognition as a sole authentication factor or modality, facial recognition of a user attempting to access the secure asset may need to meet a rather high confidence value threshold, such as but not limited to 95%, before the user is authenticated and allowed access to the secure asset. In such case, for example, if a user's appearance has changed, such as but not limited to, aging, changes in facial hair, addition or removal of glasses, etc., a confidence value for facial recognition of the user may not meet the rather high confidence value threshold of the ACS. Even though the user is authorized, the user would nonetheless be denied access due to failure to meet the high confidence value threshold.

In another example, an ACS may allow facial recognition as a sole authentication factor or modality, but may also allow at least one other authentication factor or modality to be used, if available. Accordingly, as with the previous example, where facial recognition is used as the sole authentication factor or modality, facial recognition of a user attempting to access the secure asset may need to meet a rather high confidence value threshold, such as but not limited to 95%, before the user is authenticated and allowed access to the secure asset. However, if the user has provided another authentication factor or modality, such as but not limited to, a credential via a proximity or smart card, and the credential has been validated, the threshold that the confidence value for facial recognition must meet may dynamically lower, for example, to less than 95%, such as but not limited to 80%. Of course, the combination of authentication factors and modalities is not limited to facial recognition and a credential provided via a proximity card or smart card.

Additionally or alternatively, an ACS of the present disclosure may utilize a combined confidence value that is determined as, for example, a combination of confidences for each authentication factor or modality provided by the user or is otherwise based on the confidences for each authentication factor or modality provided by the user. ACS 100, such as via reader 102, facial recognition module 103/107, controller 108, and/or host server 112, may determine whether the combined confidence value meets or exceeds a certain, possibly predefined, threshold for authentication, and if so, then the ACS 100, such as via reader 102, facial recognition module 103/107, controller 108, and/or a host server 112, may permit access to the secure asset 104 by the user of the credential device 114. The threshold that the combined confidence value must meet may dynamically change based on, for example but not limited to, the number of authentication factors or modalities provided, the type of each authentication factor or modality provided, and/or the inherent confidence provided by each authentication factor or modality. Likewise, the threshold that the confidence value for any particular authentication factor or modality must individually meet for authentication can be dynamically changed (e.g., lowered) when more than one authentication factor or modality is presented.

Figure 5:
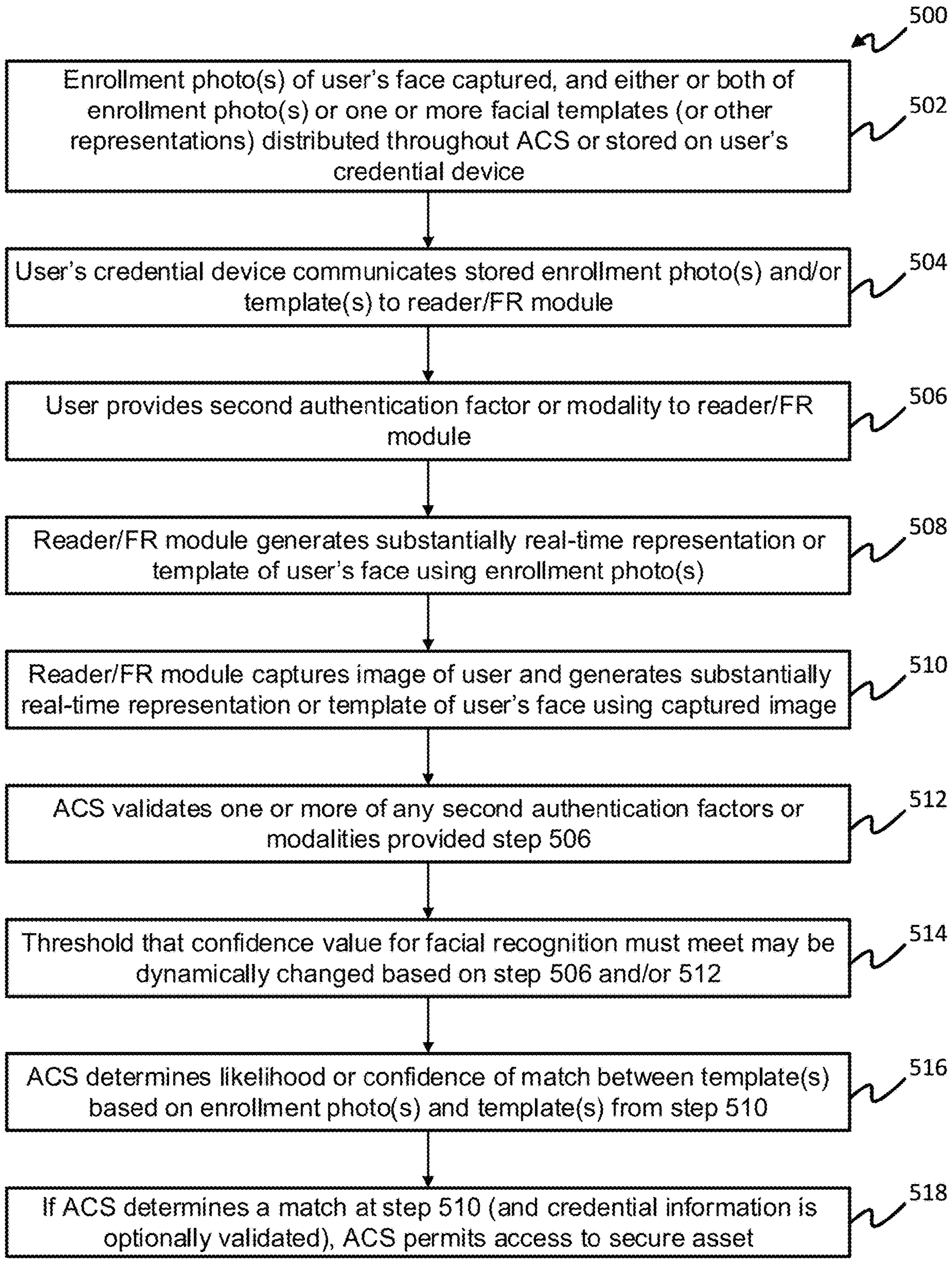
FIG. 5 is a flow diagram of a method for authenticating a user in an ACS.

FIG. 5 illustrates a method 500, in an ACS, for permitting or denying access to a secure asset. At step 502, during an enrollment process, for example, a user has one or more verified pictures of their face captured (e.g., an enrollment photo), and either or both of the one or more enrollment photos or one or more facial templates (or other representations) generated from the enrollment photo(s), as described above, are distributed to one or more devices within the ACS or stored directly on a credential device of the user. At step 504, as the user approaches a reader and/or facial recognition module ("reader/FR module") of the ACS, in certain example embodiments where the enrollment photo(s) or template(s) are not distributed within the ACS, the user's credential device may communicate at least one of the stored enrollment photos and/or at least one of the stored templates to the reader/FR module, for example, via a suitable RFID or PAN technology. Also, in step 506, as the user approaches or upon reaching the reader of the ACS, the user may provide one or more second authentication factors or modalities, such as but not limited to, a proximity or smart card having a credential or credential data stored thereon, a magnetic stripe card having a credential or credential data stored thereon, a password via, for example, user interface 312, a fingerprint, iris scan, or other biometric via, for example, user interface 312, voice recognition, etc. As mentioned above, in some example embodiments, such as but not limited to certain LACS embodiments, the reader/FR module and the user's credential device may be the same device, wherein, for example, the user may be attempting to access a logical asset, such as but not limited to, a financial or personal account, via the user's own mobile device. In such cases, the reader/FR module (i.e., the user's mobile device) may already contain the enrollment photo(s)/template(s) and any credential or credential data of the user. At step 508, if one or more enrollment photo(s) were distributed within the ACS or communicated from the user's credential device to the reader/FR module in step 504, then the reader/FR module, alone or in conjunction with the ACS controller and/or host server, can generate at least one substantially real-time representation or model (e.g., facial template) of the user's face using the enrollment photo(s). At step 510, which may occur before, simultaneous with, or after steps 504 and 506, the reader/FR module captures at least one probe image of the user and, alone or in conjunction with the ACS controller and/or host server, can generate at least one substantially real-time representation or model (e.g., facial template) of the user's face using the captured probe image(s). At step 512, which may occur any time after step 506, the ACS may validate one or more of any second authentication factors or modalities provided by the user at step 506. At step 514, the threshold that the confidence value for facial recognition must meet may be dynamically changed based on the result of step 506 and/or 512. For example, the threshold that the confidence value for facial recognition must meet may be dynamically changed (e.g., lowered), depending on whether any second authentication factor or modality is provided, the number of such second authentication factors or modalities provided, the type of any such second authentication factor or modality, and/or an authentication confidence of each of one or more of such second authentication factors or modalities. At step 516, the at least one template distributed within or generated by the ACS based on the enrollment photo(s) or received from the user's credential device may then be used by the reader/FR module, alone or in conjunction with the ACS controller and/or host server, as the gallery image(s) for comparison against a template or other representation generated from the probe image(s) of the user captured at step 510 to determine the likelihood or confidence of a match. At step 518, if the reader/FR module, alone or in conjunction with the ACS controller and/or host server, determines a likelihood or confidence of a match at step 516 that meets or exceeds the dynamic threshold, and in cases where one or more second authentication factors or modalities have been provided by the user and are also required by the ACS for access to the secure asset, if the reader/FR module, alone or in conjunction with the ACS controller and/or host server, determines that any or all of such second authentication factors or modalities are valid, then the ACS, such as via the reader/FR module, controller, and/or a host server, may permit access to the secure asset by the user.

In yet another example embodiment, ACS 100, such as via reader 102, facial recognition module 103/107, controller 108, and/or host server 112, may first attempt to authenticate the user 101 based on facial recognition, as described above. If the confidence value for facial recognition meets or exceeds the threshold required for authentication based solely on facial recognition, the user 101 may be authenticated and authorized to access the secure asset 104. However, if the confidence value for facial recognition does not meet the threshold required for authentication based solely on facial recognition, ACS 100, such as via reader 102, facial recognition module 103/107, controller 108, and/or host server 112, may utilize a messaging system, such as but not limited to Firebase, to automatically trigger, or instruct the user to trigger, the user's credential device 114, such as via an application executing on the credential device, to communicate the user's credential or credential data to the reader and/or facial recognition module. The user's credential device 114 may also be triggered to communicate a current location of the credential device to reader 102 and/or facial recognition module 103/107. Thereafter, reader 102 and/or facial recognition module 103/107, alone or in conjunction with controller 108 and/or host server 112, can authenticate the received credential or credential data for the user, and optionally, the current location of credential device 114. Since conventional card-based or virtual card based ACS embodiments generally have a 100% confidence that a given credential is authorized or not, if the received credential or credential data for the user is authenticated (e.g., valid) and optionally the current location indicates credential device 114 is within a threshold distance from reader 102, facial recognition module 103/107, and/or secure asset 104, the user 101 may be authorized to access the secure asset. In this way, facial recognition may be used as the sole authentication factor or modality, and a second authentication factor or modality may be requested, and in some cases automatically triggered (e.g., without additional action by the user), in cases where the confidence value for facial recognition does not meet the threshold required for authentication based solely on facial recognition.

Figure 6:
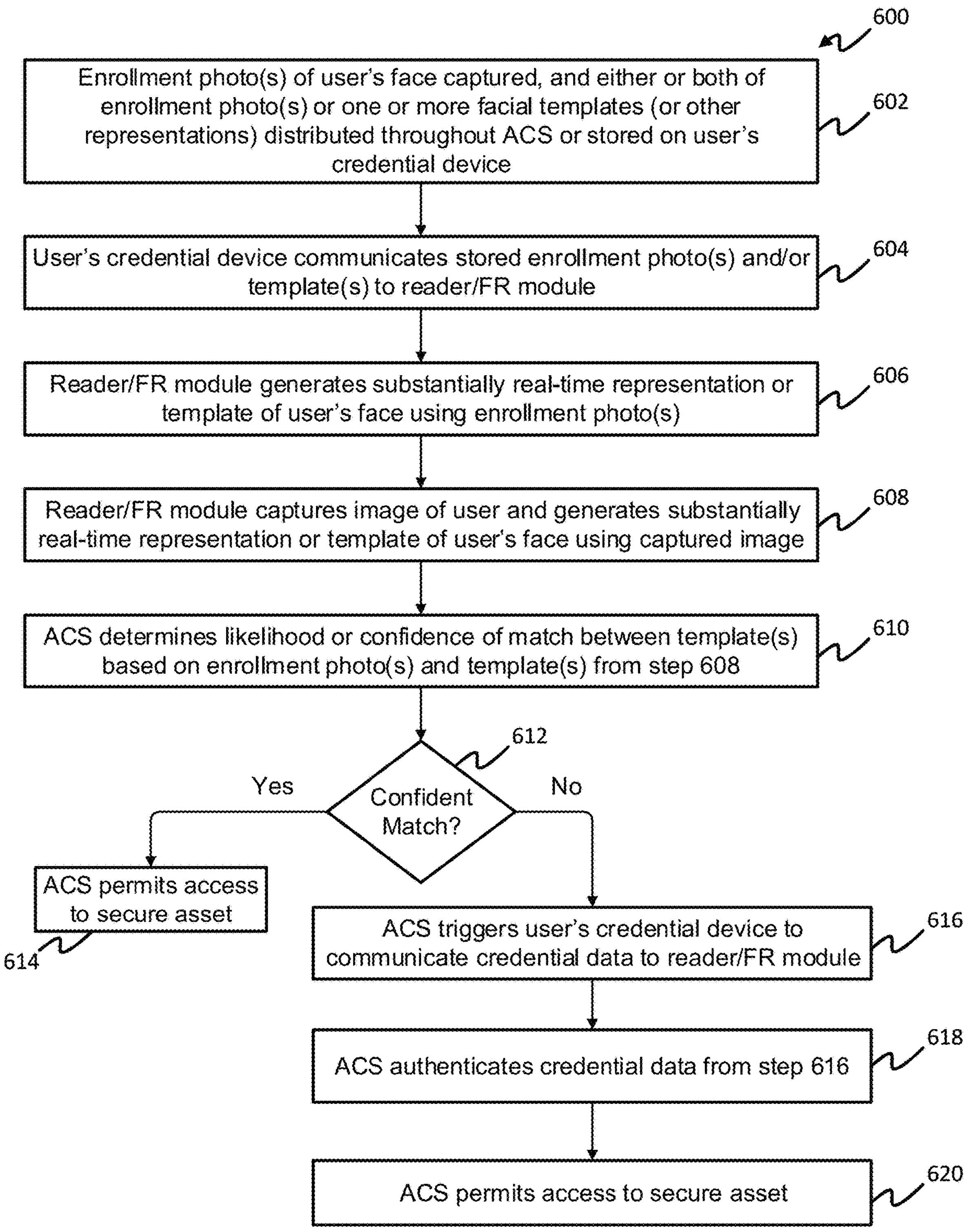
FIG. 6 is a flow diagram of another method for authenticating a user in an ACS.

FIG. 6 illustrates such a method 600, in an ACS, for permitting or denying access to a secure asset. At step 602, during an enrollment process, for example, a user has one or more verified pictures of their face captured (e.g., an enrollment photo), and either or both of the one or more enrollment photos or one or more facial templates (or other representations) generated from the enrollment photo(s), as described above, are distributed to one or more devices within the ACS or stored directly on a credential device of the user. At step 604, as the user approaches a reader and/or facial recognition module ("reader/FR module") of the ACS, in certain example embodiments where the enrollment photo(s) or template(s) are not distributed within the ACS, the user's credential device may communicate at least one of the stored enrollment photos and/or at least one of the stored templates to the reader/FR module, for example, via a suitable RFID or PAN technology. As mentioned above, in some example embodiments, such as but not limited to certain LACS embodiments, the reader/FR module and the user's credential device may be the same device, wherein, for example, the user may be attempting to access a logical asset, such as but not limited to, a financial or personal account, via the user's own mobile device. In such cases, the reader/FR module (i.e., the user's mobile device) may already contain the enrollment photo(s)/template(s). At step 606, if one or more enrollment photo(s) were distributed within the ACS or communicated from the user's credential device to the reader/FR module in step 604, then the reader/FR module, alone or in conjunction with the ACS controller and/or host server, can generate at least one substantially real-time representation or model (e.g., facial template) of the user's face using the enrollment photo(s). At step 608, which may occur before, simultaneous with, or after steps 604 and 606, the reader/FR module captures at least one probe image of the user and, alone or in conjunction with the ACS controller and/or host server, can generate at least one substantially real-time representation or model (e.g., facial template) of the user's face using the captured probe image(s). At step 610, the at least one template distributed within or generated by the ACS based on the enrollment photo(s) or received from the user's credential device may then be used by the reader/FR module, alone or in conjunction with the ACS controller and/or host server, as the gallery image(s) for comparison against a template or other representation generated from the probe image(s) of the user captured at step 608 to determine the likelihood or confidence of a match. At step 612, the reader/FR module, alone or in conjunction with the ACS controller and/or host server, determines whether a likelihood or confidence of a match determined at step 610 meets or exceeds a confidence threshold. If so, at step 614, the ACS, such as via the reader/FR module, controller, and/or a host server, may permit access to the secure asset by the user. If the reader/FR module, alone or in conjunction with the ACS controller and/or host server, determines a likelihood or confidence of a match at step 610 does not meet the confidence threshold, then at step 616, the ACS, such as via the reader/FR module, controller, and/or a host server, may use a messaging system to automatically trigger, or instruct the user to trigger, the user's credential device, such as via an application executing on the credential device, to communicate the user's credential or credential data to the reader/FR module. As mentioned above, the user's credential device may also be triggered to communicate a current location of the credential device to reader/FR module. At step 618, the reader/FR module, alone or in conjunction with the controller and/or host server, can authenticate the received credential or credential data for the user, and optionally, the current location of credential device. At step 620, if the received credential or credential data for the user is authenticated (e.g., valid) and optionally the current location indicates credential device 114 is within a threshold distance from reader/FR module and/or the secure asset, the ACS, such as via the reader/FR module, controller, and/or a host server, may permit access to the secure asset by the user.

Although the flowcharts of FIGS. 5 and 6 illustrate an example methods as comprising sequential steps or processes as having a particular order of operations, many of the steps or operations in the flowcharts can be performed in parallel or concurrently, and the flowcharts should be read in the context of the various embodiments of the present disclosure. The order of the method steps or process operations illustrated in FIGS. 5 and 6 may be rearranged for some embodiments. Similarly, the methods illustrated in FIGS. 5 and 6 could have additional steps or operations not included therein or fewer steps or operations than those shown.

The above example embodiments provide several advantages, including but not limited to:

(1) Facial recognition may be improved by automated, additional, non-facial recognition authentication.

(2) Security is improved by additional multi-factor authentication, where desired or needed.

(3) A lower confidence value for facial recognition may be allowed when combined with a second authentication factor or modality.

ADDITIONAL EXAMPLES

Example 1 includes subject matter relating to a non-transitory computer readable medium comprising executable program code, that when executed by one or more processors, causes the one or more processors to: receive, at a reader device, at least one of a first image of a user or a first representation of a face of the user; if a first image of the user was received, then generate, at the reader device, a generated representation of the face of the user using the first image; capture, at the reader device, a second image of the user and generate a second representation of the face of the user using the second image; determine a likelihood of a match between the second representation and at least one of the first representation and the generated representation; and if the likelihood of a match does not meet a confidence threshold, receive, at the reader device from the user, an authentication factor, determine validity of the authentication factor, and permit access by the user to a secure asset in instances where the authentication factor is valid.

In Example 2, the subject matter of Example 1 optionally includes wherein the at least one of the first image or the first representation are received from a credential device of the user.

In Example 3, the subject matter of Example 1 or 2 optionally includes wherein the executable code, when executed by the one or more processors, further causes the one or more processors to permit access by the user to the secure asset if the likelihood of a match meets the confidence threshold, without receiving the authentication factor.

In Example 4, the subject matter of any of Examples 1 to 3 optionally includes wherein receiving the authentication factor comprises using a messaging system to automatically trigger a credential device of the user to communicate the authentication factor to the reader device.

In Example 5, the subject matter of any of Examples 1 to 3 optionally includes wherein receiving the authentication factor comprises using a messaging system to instruct the user via a credential device of the user to communicate the authentication factor to the reader device.

In Example 6, the subject matter of any of Examples 1 to 5 optionally includes wherein the executable code, when executed by the one or more processors, further causes the one or more processors to receive, at the reader device, information about a current location of a credential device of the user.

In Example 7, the subject matter of Example 6 optionally includes wherein receiving the information about the current location of the credential device comprises using a messaging system to automatically trigger the credential device to communicate the information about the current location of the credential device to the reader device.

In Example 8, the subject matter of Example 6 or 7 optionally includes wherein permitting access by the user to the secure asset in instances where the authentication factor is valid comprises permitting access by the user to the secure asset where the authentication factor is valid and the current location of the credential device is determined to be within a threshold distance of the reader device.

In Example 9, the subject matter of any of Examples 1 to 8 optionally includes wherein the authentication factor is a credential stored on the credential device.

In Example 10, the subject matter of any of Examples 1 to 8 optionally includes wherein the authentication factor is a biometric of the user.

In Example 11, the subject matter of any of Examples 1 to 8 optionally includes wherein the authentication factor is a password known to the user.

Example 12 includes subject matter relating to a device for permitting access to a secure asset, the device comprising: at least one processor; and memory storing instructions that when executed by the at least one processor cause the at least one processor to: receive, at a reader device, at least one of a first image of a user or a first representation of a face of the user; if a first image of the user was received, then generate, at the reader device, a generated representation of the face of the user using the first image; capture, at the reader device, a second image of the user and generate a second representation of the face of the user using the second image; determine a likelihood of a match between the second representation and at least one of the first representation and the generated representation; and if the likelihood of a match does not meet a confidence threshold, receive, at the reader device from the user, an authentication factor, determine validity of the authentication factor, and permit access by the user to the secure asset in instances where the authentication factor is valid.

In Example 13, the subject matter of Example 12 optionally includes wherein the instructions, when executed by the at least one processor, further cause the at least one processor to permit access by the user to the secure asset if the likelihood of a match meets the confidence threshold, without receiving the authentication factor.

In Example 14, the subject matter of Example 12 or 13 optionally includes wherein receiving the authentication factor comprises using a messaging system to automatically trigger a credential device of the user to communicate the authentication factor.

In Example 15, the subject matter of Example 12 or 13 optionally includes wherein receiving the authentication factor comprises using a messaging system to instruct the user via a credential device of the user to communicate the authentication factor.

In Example 16, the subject matter of any of Examples 12 to 15 optionally includes wherein the instructions, when executed by the at least one processor, further cause the at least one processor to receive information about a current location of a credential device of the user.

In Example 17, the subject matter of Example 16 optionally includes wherein receiving the information about the current location of the credential device comprises using a messaging system to automatically trigger the credential device to communicate the information about the current location of the credential device.

In Example 18, the subject matter of Example 16 or 17 optionally includes wherein permitting access by the user to the secure asset in instances where the authentication factor is valid comprises permitting access by the user to the secure asset where the authentication factor is valid and the current location of the credential device is determined to be within a threshold distance of the device.

In Example 19, the subject matter of any of Examples 12 to 18 optionally includes wherein the device comprises a reader device connected with a facial recognition module that is external to the reader device, the facial recognition module comprising an optical sensor for capturing the second image of the user.

In Example 20, the subject matter of Example 19 optionally includes wherein: the reader device is configured with the instructions that cause the at least one processor to receive the authentication factor, determine validity of the authentication factor, and permit access by the user to the secure asset in instances where the authentication factor is valid; and the facial recognition module is configured with the instructions for capturing the second image of the user.

Additional Notes

The above detailed description includes references to the accompanying drawings, which form a part of the detailed description. The drawings show, by way of illustration, specific embodiments that can be practiced. These embodiments may also be referred to herein as "examples." Such embodiments or examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein. That is, the above-described embodiments or examples or one or more aspects, features, or elements thereof can be used in combination with each other.

As will be appreciated by one of skill in the art, the various embodiments of the present disclosure may be embodied as a method (including, for example, a computer-implemented process, a business process, and/or any other process), apparatus (including, for example, a system, machine, device, computer program product, and/or the like), or a combination of the foregoing. Accordingly, embodiments of the present disclosure or portions thereof may take the form of an entirely hardware embodiment, an entirely software embodiment (including firmware, middleware, microcode, hardware description languages, etc.), or an embodiment combining software and hardware aspects. Furthermore, embodiments of the present disclosure may take the form of a computer program product on a computer-readable medium or computer-readable storage medium, having computer-executable program code embodied in the medium, that define processes or methods described herein. A processor or processors may perform the necessary tasks defined by the computer-executable program code. In the context of this disclosure, a computer readable medium may be any medium that can contain, store, communicate, or transport the program for use by or in connection with the systems disclosed herein. As indicated above, the computer readable medium may be, for example but is not limited to, an electronic, magnetic, optical, electromagnetic, infrared, or semiconductor system, apparatus, or device. More specific examples of suitable computer readable medium include, but are not limited to, an electrical connection having one or more wires or a tangible storage medium such as a portable computer diskette, a hard disk, a random access memory (RAM), a read-only memory (ROM), an erasable programmable read-only memory (EPROM or EEPROM), a compact disc read-only memory (CD-ROM), or other optical, magnetic, or solid state storage device. As noted above, computer-readable media includes, but is not to be confused with, computer-readable storage medium, which is intended to cover all physical, non-transitory, or similar embodiments of computer-readable media.

As used herein, the terms "substantially" or "generally" refer to the complete or nearly complete extent or degree of an action, characteristic, property, state, structure, item, or result. For example, an object that is "substantially" or "generally" enclosed would mean that the object is either completely enclosed or nearly completely enclosed. The exact allowable degree of deviation from absolute completeness may in some cases depend on the specific context. However, generally speaking, the nearness of completion will be so as to have generally the same overall result as if absolute and total completion were obtained. The use of "substantially" or "generally" is equally applicable when used in a negative connotation to refer to the complete or near complete lack of an action, characteristic, property, state, structure, item, or result. For example, an element, combination, embodiment, or composition that is "substantially free of" or "generally free of" an element may still actually contain such element as long as there is generally no significant effect thereof.

In the foregoing description various embodiments of the present disclosure have been presented for the purpose of illustration and description. They are not intended to be exhaustive or to limit the invention to the precise form disclosed. Obvious modifications or variations are possible in light of the above teachings. The various embodiments were chosen and described to provide the best illustration of the principals of the disclosure and their practical application, and to enable one of ordinary skill in the art to utilize the various embodiments with various modifications as are suited to the particular use contemplated. All such modifications and variations are within the scope of the present disclosure as determined by the appended claims when interpreted in accordance with the breadth they are fairly, legally, and equitably entitled.

What is claimed is:

1. A non-transitory computer readable medium comprising executable code, that when executed by one or more processors, causes the one or more processors to:

receive, at a reader device, at least one of a first image of a user or a first representation of a face of the user;

if a first image of the user was received, then generate, at the reader device, a generated representation of the face of the user using the first image;

capture, at the reader device, a second image of the user and generate a second representation of the face of the user using the second image;

determine a likelihood of a match between the second representation and at least one of the first representation and the generated representation; and responsive to a determination that the likelihood of the match between the second representation and at least one of the first representation and the generated representation does not meet a confidence threshold, send a credential request message using a messaging system to a portable electronic credential device of the user, receive, responsive to the credential request message, a stored authentication factor at the reader device from a memory of the portable electronic credential device of the user, determine validity of the stored authentication factor, and permit access by the user to a secure asset in instances where the stored authentication factor is valid.

2. The non-transitory computer readable medium of claim 1, wherein at least one of the first image or the first representation are received from the portable electronic credential device of the user.

3. The non-transitory computer readable medium of claim 1, wherein the executable code, when executed by the one or more processors, further causes the one or more processors to permit access by the user to the secure asset if the likelihood of a match meets the confidence threshold, without receiving the stored authentication factor.

4. The non-transitory computer readable medium of claim 1, wherein the executable code, when executed by the one or more processors, further causes the one or more processors to receive, at the reader device, information about a current location of the portable electronic credential device of the user.

5. The non-transitory computer readable medium of claim 4, wherein receiving the information about the current location of the portable electronic credential device comprises using the messaging system to automatically trigger the portable electronic credential device to communicate the information about the current location of the portable electronic credential device to the reader device.

6. The non-transitory computer readable medium of claim 4, wherein permitting access by the user to the secure asset in instances where the stored authentication factor is valid comprises permitting access by the user to the secure asset where the stored authentication factor is valid and the current location of the portable electronic credential device is determined to be within a threshold distance of the reader device.

7. The non-transitory computer readable medium of claim 1, wherein the stored authentication factor is a credential stored on the portable electronic credential device.

8. The non-transitory computer readable medium of claim 1, wherein the stored authentication factor is a biometric of the user.

9. The non-transitory computer readable medium of claim 1, wherein the stored authentication factor is a password known to the user.

10. A method for permitting access to a secure asset, the method comprising:

receiving, at a reader device, at least one of a first image of a user or a first representation of a face of the user;

if a first image of the user was received, then generating, at the reader device, a generated representation of the face of the user using the first image;

capturing, at the reader device, a second image of the user and generating a second representation of the face of the user using the second image;

determining a likelihood of a match between the second representation and at least one of the first representation and the generated representation; and in response to determining the likelihood of the match between the second representation and at least one of the first representation and the generated representation does not meet a confidence threshold, sending a credential request message using a messaging system to a portable electronic credential device of the user, receiving, responsive to the credential request message, a stored authentication factor at the reader device from a memory of the portable electronic credential device of the user, determining validity of the stored authentication factor, and permitting access by the user to the secure asset in instances where the stored authentication factor is valid.

11. The method of claim 10, further comprising permitting access by the user to the secure asset in response to determining the likelihood of a match meets the confidence threshold, without receiving the stored authentication factor.

12. The method of claim 10, further comprising receiving information about a current location of the portable electronic credential device of the user.

13. The method of claim 12, wherein receiving the information about the current location of the portable electronic credential device comprises using the messaging system to automatically trigger the portable electronic credential device to communicate the information about the current location of the portable electronic credential device.

14. The method of claim 12, wherein permitting access by the user to the secure asset in instances where the stored authentication factor is valid comprises permitting access by the user to the secure asset where the stored authentication factor is valid and the current location of the portable electronic credential device is determined to be within a threshold distance of the reader device.

15. The method of claim 10, wherein the reader device comprises an optical sensor for capturing the second image of the user.

16. The method of claim 15, wherein:

capturing the second image of the user comprises receiving, at the reader device, the second image from a facial recognition module external to the reader device; and the facial recognition module comprises an optical sensor for capturing the second image of the user.

17. A method for permitting access to a secure asset, the method comprising:

receiving, at a reader device, at least one of a first image of a user or a first representation of a face of the user;

if a first image of the user was received, then generating, at the reader device, a generated representation of the face of the user using the first image;

capturing, at the reader device, a second image of the user and generating a second representation of the face of the user using the second image;

determining a likelihood of a match between the second representation and at least one of the first representation and the generated representation; and in response to determining the likelihood of the match between the second representation and at least one of the first representation and the generated representation does not meet a confidence threshold, sending a credential request message using a messaging system to a portable electronic credential device of the user, the credential request message triggering the portable electronic credential device to send a stored authentication factor from a memory of the portable electronic credential device of the user to the reader device, determining validity of the stored authentication factor at the reader device, and permitting access by the user to a secure asset in instances where the stored authentication factor is valid.

* * * * *